(12) United States Patent
Maka

(10) Patent No.: US 6,521,338 B1
(45) Date of Patent: Feb. 18, 2003

(54) LOW NOISE STRETCH FILM

(75) Inventor: Xavier Maka, Charency-Vezin (FR)

(73) Assignee: Mima Films S.C.A. (LU)

( * ) Notice: Subject to any disclaimer, the term of this patent is extended or adjusted under 35 U.S.C. 154(b) by 0 days.

(21) Appl. No.: 09/488,846

(22) Filed: Jan. 21, 2000

(30) Foreign Application Priority Data

Jan. 21, 1999 (EP) ............................................ 99300450

(51) Int. Cl.⁷ ............................................... B32B 27/32
(52) U.S. Cl. ................................ 428/355 EN; 428/516; 53/441; 264/173.14; 264/173.15; 264/173.19
(58) Field of Search .......................... 428/516, 355 EN; 53/441, 556, 389.4; 264/173.15, 173.19, 173.14

(56) References Cited

U.S. PATENT DOCUMENTS

| | | | |
|---|---|---|---|
| 4,518,654 A | 5/1985 | Eichbauer et al. .......... | 428/331 |
| 5,147,709 A | * 9/1992 | Dohrer et al. .............. | 428/213 |
| 5,884,453 A | * 3/1999 | Ramsey et al. ................ | 53/441 |

FOREIGN PATENT DOCUMENTS

| EP | 0 287 272 | 10/1988 |
|---|---|---|
| WO | 95/15851 | 6/1995 |
| WO | 96/29203 | 9/1996 |

\* cited by examiner

*Primary Examiner*—D. Lawrence Tarazano
(74) *Attorney, Agent, or Firm*—Lowe Hauptman Gilman & Berner, LLP

(57) ABSTRACT

A multilayer stretch film comprises a first layer having cling properties and comprising an homogeneously-branched copolymer of ethylene and a $C_{4-8}$ α-olefin, the copolymer having a density in the range 0.850 to 0.890 g/cm³, and a second layer having substantially no cling properties and comprising at least 80 wt. % of a low density polyethylene having a density in the range 0.915 to 0.940 g/cm³. Optionally, the film may comprise at least one core layer between the first and second layers. Films of this type are particularly suited to palletisation of loads.

16 Claims, No Drawings

LOW NOISE STRETCH FILM

FIELD OF THE INVENTION

The present invention relates to stretch wrap film, and its use in the palletisation of loads. In particular, the invention relates to blown stretch wrap film which generates low noise in use.

BACKGROUND OF THE INVENTION

When using a stretch film to wrap goods, either using a hand applicator or a semi- or totally automated machine, considerable noise may be generated as the stretch film is unwound from its supply roll. In some cases, the noise generated may be in excess of that which can be safely tolerated for long term exposure by the human ear. This is particularly disadvantageous when the film is to be unwound by hand or using a semi-automated machine, because of the presence of personnel close to the supply roll.

There have been various proposals to overcome this problem. One such proposal has been to employ a manufacturing method known as chill roll casting. This method involves extrusion of a polymer melt on to water-cooled rollers, thereby achieving rapid cooling of the resultant film. However, it has not proved possible to adapt this technology to the manufacture of the traditionally tougher, stiffer and more crystalline blown films.

Another proposal to overcome the problem of excess unwind noise is disclosed in the Applicant's co-pending patent application WO-A-9629203, in the form of a one-sided cling film having, on one side of the film, a cling layer comprising ultra low density polyethylene (ULDPE), and, on the other side of the film, a non-cling layer comprising low density polyethylene (LDPE) and a solid particulate antiblock additive. The noise levels reported for films of this type range from 85 dB to 96 dB, and therefore except for those films generating a noise level on unwinding at the lower end of this range, it remains necessary, for hearing safety, to limit the period for which an operator is exposed to unwinding of the film.

Furthermore, a problem associated with the use of antiblock additives is that these may be present at the surface of the film during film manufacture and usage, causing undesirable build-up on equipment, necessitating stoppage for cleaning, and diluting the desired effects of those additives in the final film. Some antiblock additives also weaken the film, leading to premature film fracture, and may also detract from film clarity.

WO-A-9515851 discloses blown and cast one-sided cling stretch wrap films which do not require the use of additives or functional polymers to improve their cling properties. These films comprise a cling layer of an homogeneously-branched ethylene polymer having a density of up to about 0.90 g/cm$^3$, and a non-cling polyolefin layer having a density of greater than about 0.90 g/cm$^3$. However, because WO-A-951581 is not concerned with the production of blown stretch wrap films which, on unwinding from a supply roll, generate comparatively low noise, it does not disclose or give any indication of the noise level generated on unwinding its films.

SUMMARY OF THE INVENTION

According to a first aspect of the present invention, a multilayer blown stretch film comprises a first layer having cling properties and comprising a copolymer of ethylene and a C$_{4-8}$ $\alpha$-olefin, the copolymer having a density in the range 0.850 to 0.890 g/cm$^3$, and a second layer having substantially no cling properties and comprising at least 70 wt. % of a low density polyethylene having a density in the range 0.915 to 0.940 g/cm$^3$.

The noise level generated during unwinding of this film is a maximum of 85 dB, and is typically significantly less than this, for instance around 82 dB or less. Accordingly the period for which an operator may be exposed to unwinding of the film is not limited by hearing safety.

According to a second aspect of the present invention, a method of making a multilayer blown stretch film comprises co-extruding a copolymer of ethylene and a C$_{4-8}$ $\alpha$-olefin, the copolymer having a density in the range 0.850 to 0.890 g/cm$^3$, with a polymer composition comprising at least 70 wt. % of a low density polyethylene having a density in the range 0.915 to 0.940 g/cm$^3$, to form a tube having the ethylene copolymer in one layer and the polymer composition in another layer, and blowing and then cooling the tube, by blown film co-extrusion techniques known to those skilled in the art.

According to a third aspect of the present invention, a film as described above is used in the palletisation of loads.

DESCRIPTION OF THE INVENTION

The multilayer film of the present invention is a stretch film, by which we mean it may be stretched by more than 100%, and typically by more than 200%, of its original, unstretched, length, without damage thereto or loss of one-sided cling properties.

The film may be an A/B film, in which layer A is the cling layer and layer B the non-cling layer. Preferably, the film may include one or more layers in addition, and positioned between, the cling and non-cling layers, to add bulk or to confer other properties on the film. In this case, the properties of the intermediate, or core, layer or layers are typically selected according to the application for which the film is ultimately intended.

The cling layer of the film comprises a copolymer of ethylene and a C$_{4-8}$ $\alpha$-olefin, and has a density in the range 0.850 to 0.890 g/cm$^3$, preferably in the range 0.860 to 0.885 g/cm$^3$, and more preferably in the range 0.865 to 0.875 g/cm$^3$. Suitable ethylene copolymers are very low density polyethylenes (VLDPE), ultra low density polyethylenes (ULDPE), or linear low density polyethylenes (LLDPE), referred to in the industry as "polyolefin plastomers", abbreviated to "POPs". Such materials are amorphous in nature. Commercial examples include TAFMER (Mitsui Chemical), AFFINITY and ENGAGE (Dow Chemical), DEX PLASTOMERS (DSM/Exxon JV) and EXACT (Exxon Chemical). Homogeneously-branched copolymers are preferred, and in particular homogeneously-branched POPs.

The term "homogeneously-branched" in the context of ethylene polymers is well understood in the field, and is defined, for instance, in WO-A-9515851. In summary, it is used to define copolymers of ethylene and an $\alpha$-olefin, for instance butene, hexene or octene, in which the $\alpha$-olefin monomer is randomly distributed within a given molecule; substantially all the copolymer molecules have the same ethylene: $\alpha$-olefin monomer ratio; the copolymer has a narrow short chain (i.e. less than 6 carbon atoms) branching distribution; and the copolymer essentially lacks a measurable high density fraction.

The ethylene copolymer for use in the invention may be manufactured by any of the known processes. For instance, the preferred homogeneously-branched ethylene copolymer may be manufactured as described in WO-A-9515851, or the various patents referred to therein.

Preferably, the ethylene copolymer has a melt index in the range 0.5 to 3.0 g/10 min, preferably 0.5 to 1.5 g/10 min, as measured by ASTM norm D1238 (190° C./2.16 kg), for ease of processing.

The polymer composition for use as the non-cling layer comprises at least 70 wt. %, based on the weight of the non-cling layer, of a conventional long chain (i.e. greater than 6 carbon atoms) branched low density polyethylene (LDPE), including ethylene homopolymers and copolymers. Preferably, the non-cling layer comprises at least 80 wt. % of LDPE, more preferably at least 90 wt. %, e.g. 95 wt. % or more, and most preferably the non-cling layer consists essentially entirely of LDPE. By "consists essentially entirely of" we mean that the non-cling layer may contain materials other than LDPE, for instance additives or other ethylene or $\alpha$-olefin polymers, but in insignificant amounts so as not to have any significant deleterious effect on the absence of cling from the non-cling side of the film, or the low noise level generated on unwinding of the film. Best results are obtained with a film having a 100 wt. % LDPE non-cling layer.

The density of the LDPE is in the range 0.915 to 0.940 g/cm$^3$, and is preferably in the range 0.920 to 0.932 g/cm$^3$, and is more preferably in the range 0.924 to 0.932 g/cm$^3$, and most preferably 0.925 to 0.930 g/cm$^3$. The melt index (MI) of this polyethylene is preferably at least 1 g/10 min., for ease of processing and stretching, and is more preferably in the range 1.5 to 5.5 g/lo min., and most preferably in the range 3 to 4.5 g/10 min., as measured by ASTM norm D1238 (190° C./2.16 kg).

The non-cling layer has substantially no cling to a layer of itself. By this we mean that the non-cling layer exhibits a cling of at most 12 g/cm (30 g/inch), preferably at most 4 g/cm (10 g/inch), as measured following ASTM D4649-A3 on an unstretched film. Generally, the coefficient of friction of the non-cling later is below 1, and is typically in the range 0.4 to 0.9, preferably 0.45 to 0.8. This gives the non-cling layer a slippery feel, which is particularly desirable where products wrapped with the film may touch or slide against each other, and also helps to achieve a regular and moderate unwinding force from a supply roll, which contributes to a reduction in the noise generated on unwinding.

The level of cling between the cling and non-cling layers of the film of the present invention is typically in the range 39 to 236 g/cm (100 to 600 g/inch), preferably in the range 59 to 197 g/cm (150 to 500 g/inch), and more preferably in the range 79 to 118 g/cm (200 to 300 g/inch), as measured following ASTM D4649-A3 on an unstretched film.

As mentioned above, when the multilayer film is to include at least one layer in addition to the cling and non-cling layers, the properties of such at least one layer are selected according to the intended application of the film. Suitable examples of materials which may be utilised as an additional, core, layer include low density polyethylene (LDPE), having a density in the range 0.916 to 0.929 g/cm$^3$, medium density polyethylene (MDPE), having a density in the range 0.93 to 0.945 g/cm$^3$, high density polyethylene (HDPE), having a density greater than 0.945 g/cm$^3$, and substantially linear polyethylenes, for instance linear low density polyethylene (LLDPE), having a density in the range 0.916 to 0.929 g/cm$^3$, including homogeneously-branched LLDPE, and very low density polyethylene (VLDPE) having a density of less than 0.915 g/cm$^3$. LLDPE is preferred.

It is preferred that the film of the invention is substantially entirely composed of polyethylene, including ethylene $\alpha$-olefin copolymers, to facilitate recycling, typically for use in a core or structural layer of another film. By "substantially entirely" typically we mean that the film of the invention is composed of at least 90 wt. % polyethylene, and preferably at least 95 wt.i polyethylene, and most preferably about 100 wt. % polyethylene.

Films in accordance with the present invention have low noise on unwinding from a supply roll, and therefore the environment in which they are used need not be subject to limited exposure times in order to meet hearing safety requirements. In general, noise levels on unwinding do not exceed around 85 dB, and are typically around 78 to 82 dB or less, for instance in the range of 75 to 80 dB, as measured using a RION NA-14 Sound Level Meter positioned at 30 cm from the unwinding point of a film supply roll, at an unwind speed of 15 m/min, and in an environmental noise level of 65 dB.

Due to the inherent cling and non-cling properties of the individual layers of the film of the invention, it is not necessary to include in those layers additives such as tackifiers, and slip and antiblock agents, to impart cling or non-cling characteristics. Preferably, therefore, the film is essentially free of such additives, thereby avoiding the problems commonly associated therewith. By "essentially free" of additives we mean that the amount of such additives, if present at all, is such that the cling or non-cling properties of the film are not appreciably changed. For instance, depending on the nature of the film, cling and/or anti-cling additives may be present in an amount of less than 500 ppm each, and typically considerably less than this, for instance less than 100 ppm or less than 50 ppm.

It may, however, be desirable to include in the film of the invention additives which change other properties of the film, for instance antioxidants, colorants, and other processing aids.

The multilayer film of the invention typically has a thickness of up to 150 $\mu$m, preferably 5 to 100 $\mu$m, and more preferably 9 to 50 $\mu$m. Typically the non-cling layer will be thicker than the cling layer, the non-cling layer typically comprising up to 20%, preferably 8 to 12%, of the total thickness of the film, and the cling layer typically comprising up to 15%, preferably 5 to 9%, of the total thickness of the film. The thickness of the core layer, if present, is typically greater than each of the cling and non-cling layers, and generally comprises at least 65%, preferably 79 to 87%, of the total thickness of the film.

The multilayer film of the invention is a blown film. Suitable blown film processes are described in, for example, The Encyclopaedia of Chemical Technology, Kirk Othmer, 3rd Edition, (1981)16:416–417 and 18:191–192.

The multilayer film of the present invention is particularly suitable for use in load palletisation. This process generally involves threading a film from a supply roll through an automated or manual wrapping device, and then wrapping the film about an article or group of articles supported on a pallet, and sealing the film to itself. In the final, wrapped pallet, the non-cling layer will normally face outwards. This is advantageous because if the pallet comes into contact with another, similarly-wrapped pallet, which tends to occur during transportation, their outermost surfaces will slide past one another, and will not cling to one another, thereby avoiding damage to their wrappings.

The invention is now illustrated by way of the following Examples.

EXAMPLES

Example 1

A multilayer stretch film was prepared utilising a "Turn Key" blown film line supplied by Reifenhauser (Germany) having three extruders with the following characteristics:

Extruder A: 90 mm diameter; L/D=28 (L=length, D=diameter)
Extruder B: 150 mm diameter; L/D=30
Extruder C: 65 mm diameter; L/D=28
Die diameter=600 mm
The profile of extrusion temperature in each of the extruders was:
Extruder A: 160-160-160-160-180-180→melt temperature=193° C.; melt pressure=260×10$^5$ Pa (260 bar)
Extruder B: 220-220-220-200-200-200→melt temperature=246° C.; melt pressure=448×10$^5$ Pa (448 bar)
Extruder C: 170-175-180-180-180-180→melt temperature=186√ C.; melt pressure=144×10$^5$ Pa (144 bar)

The total output of the line was 550 kg/h, equivalent 520 kg/h Net; the line speed was 116 m/min; and the temperature of the external cooling air was 8° C.

The formulation of the film prepared was as follows:
Extruder A: Cling layer=8% of total thickness: DOW DSH8501.00 (density=0.870 g/cm$^3$; MI=0.94 g/10 min).
Extruder B: Core layer=82% of total thickness POLIMERI EUROPA FG 166 (density=0.917 kg/cm$^3$; MI=0.9 g/10 min).
Extruder C: Non-cling layer=10% of total thickness: DOW LD420R (density 0.9285 kg/cm$^3$; MI=3.27 g/10 min).

The density of the cling layer was measured following ASTM norm D792, and the density of the core and non-cling layers was measured following ASTM norm D1505. The MI of each of the layers was measured following ASTM norm D1238 (190° C./2.16 kg).

The cling and non-cling, or slip, properties of the film were measured, and the noise level generated on unwinding from a supply roll. The results are shown in Table 1.

TABLE 1

| Cling to pallet | Excellent |
|---|---|
| Cling in laboratory: | |
| Cling vs non-cling | 100 g/cm (255 g/inch) |
| Non-cling vs non-cling | 0 g/cm (g/inch) |
| COF (Coefficient of friction) | 0.52 (0.67 as a peak) |
| Haze | 3.2 (vs min 5% for typical blown film) |
| Noise level | 79 dB |
| Unwinding force | 4.05 daN |

Laboratory cling was measured following ASTM norm D4649-A3. Noise level was measured with a RION NA-14 Sound Level Meter fixed at 30 cm from the roll (unwinding point), with an unwind speed of 15 m/min, in an environmental noise level of 65 dB.

Unwinding force was measured with a load cell on the unwinder.

As is apparent from the above, the noise level generated on unwinding the film of the invention is considerably less than that generated on unwinding conventional blown films. The unwinding force, i.e. the force necessary to unwind the film from its supply roll, was regular and slightly higher, about 10% higher, than that required to unwind conventional blown films. This regular unwinding force, indicative of a slight blocking of the film, is believed to be partly responsible for the reduction in noise generated on unwinding.

Examples 2 to 4 and Comparative Examples 1 and 2

The A/B/C film structures shown in Table 2 below were prepared by a blown co-extrusion technique using a three extruder configuration with the following characteristics:
Extruder A: 60 horsepower Egan outer layer extruder, 6.4 cm (2.5 inch) diameter, 182° C.
Extruder B: 75 horsepower Egan core layer extruder, 6.4 cm (2.5 inch) diameter, 221° C.
Extruder C: 20 horsepower Johnson inner layer extruder, 5.1 cm (2 inch) diameter, 204° C.

Molten polymer exited the three extruders into a Johnson 3-layer 20.3 cm (8 inch) co-extrusion spiral mandrel die fitted with a die pin and a 0.2 cm (0.07 inch) die gap. The pumping rates of the extruders were adjusted to maintain a 10%/80%/10% film layer thickness ratio. The line speed used was 52 m/min. The melt temperature for each extruder was as follows: Extruder A—about 182° C. (360° F.); Extruder B—about 221° C. (430° F.); and Extruder C—about 204° C. (400° F.).

The cling and non-cling properties of each of the films were measured, and the noise level generated on unwinding from a supply roll. The results of these measurements are also provided in Table 2 below. Cling force and noise level were measured using different methods to those used for Example 1, but clearly demonstrate the importance of a high proportion of LDPE in the non-cling layer for achieving low unwind noise.

Noise level was measured using a Radio Shack Digital Sound Meter positioned 46 cm (18 inch) from the supply roll. The film was unwound at a steady rate of 17 m/min (55 ft/min), and the minimum and maximum positions of the meter needle noted over a 30 second period. Background noise was 73 dB.

Cling and non-cling properties were measured in terms of the force necessary to separate two 10 cm diameter round pieces of the same film positioned outer (cling) layer to inner (non-cling) layer, inner layer to inner layer, and outer layer to outer layer using a Tinius-Olsen 1000 Universal Tester. The films were brought into contact under the weight of the upper film holder (815 g) for 1 minute, then the additional force (beyond the weight of the upper film holder) necessary to separate the two films at a speed of 0.5 cm/min (0.20 inch/min) was measured.

TABLE 2

| | Example 2 | Example 3 | Example 4 | Comparative Example 1 | Comparative Example 2 |
|---|---|---|---|---|---|
| Outer Layer A (Cling) | EXACT 4049 | AFFINITY KC 8852 | AFFINITY KC 8852 | AFFINITY KC 8852 | AFFINITY KC 8852 |
| Core Layer B | DOWLEX 2056A | DOWLEX 2056A | DOWLEX 2056A | DOWLEX 2056A | DOWLEX 2056A |
| Inner Layer C (Non-Cling) | LDPE 5351 | LDPE 5351 | 20% DOWLEX 2056A 80% LDPE 5351 | 50% DOWLEX 2056A 50% LDPE 5351 | 80% DOWLEX 2056A 20% LDPE 5351 |

TABLE 2-continued

|  | Example 2 | Example 3 | Example 4 | Comparative Example 1 | Comparative Example 2 |
|---|---|---|---|---|---|
| Guage (μm) | 92 | 90 | 92 | 89 | 94 |
| Unwind Noise (dB) | 74–69 | 75–69 | 81–71 | 100–82 | 100–90 |
| Unwind Force (kg) | 6.3 | 5.8 | 8.1 | 10.5 | 10.9 |
| Cling (kg) | — | — | — | — | — |
| Inner to Outer | 0.05 | 0.05 | 0.07 | 0.08 | 0.07 |
| Inner to Inner | 0.00 | 0.00 | 0.00 | 0.00 | 0.00 |
| Outer to Outer | 0.06 | 0.05 | 0.09 | 0.10 | 0.10 |

In Table 2, the materials used are as follows:

EXACT 4049 (supplied by Exxon)—ethylene-butene plastomer, density=0.873 g/cm$^3$, MI=4.5 g/10 min.

AFFINITY KC 8852 (supplied by The Dow Chemical Company)—ethylene-octene plastomer, density=0.875 g/cm$^3$, MI=3.0 g/ 10 min.

DOWLEX 2056A (supplied by The Dow Chemical Company)—ethylene-octene LLDPE copolymer, density= 0.920 g/cm$^3$, MI=1.0 g/10 min.

LDPE 535I (supplied by The Dow Chemical Company)—conventional branched LDPE, density=0.926 g/cm$^3$, MI=1.9 g/10 min.

The results illustrate the criticality of the proportion of LDPE in the non-cling layer for achieving low unwind noise. The films of Examples 2 and 3 had non-cling layers consisting solely of LDPE, and exhibited the lowest unwind noise. The film according to Example 4 contained 80 weight percent LDPE, and exhibited higher unwind noise than the films of Examples 2 and 3 but significantly lower unwind noise than conventional stretch films. In contrast, the films prepared in accordance with Comparative Examples 1 and 2 exhibited significant unwind noise, in some cases up to 100 dB. All films had good cling and non-cling properties.

What is claimed is:

1. A multilayer blown Stretch film comprising a first layer having cling properties and comprising a copolymer of ethylene and a C$_{4-8}$ α-olefin, the copolymer having a density in the range 0.850 to 0.890 g/cm$^3$, and a second layer having substantially no cling properties and comprising at least 70 wt. % of a long chain branched low density polyethylene having a density in the range 0.915 to 0.940 g/cm$^3$.

2. A film according to claim 1, wherein the first layer comprises an homogeneously-branched ethylene copolymer.

3. A film according to claim 1, wherein the first layer has a density in the range 0.860 to 0.880 g/cm$^3$ and the second layer has a density in the range 0.920 to 0.940 g/cm$^3$.

4. A film accordingly to claim 1, wherein the second layer consists essentially entirely of low density polyethylene.

5. A film according to claim 1, which is substantially free of cling or anti-cling additives.

6. A film according to any claim 1, which comprises, between the first layer and the second layer at least one core layer.

7. A film according to claim 1, which is comprises substantially entirely of polyethylene.

8. A method of making a miltilayer blown stretch film, comprising co-extruding a copolymer of ethylene and an C$_{4-8}$ α-olefin, the copolymer having a density in the range 0.850 to 0.890 g/cm$^3$, with a polymer composition comprising at least 70 wt. % or a low density polyethylene having a density in the range 0.915 to 0.940 g/cm$^3$, to form a tube having the homogeneously-branched copolymer in one layer and the polymer composition in another layer, and blowing and then cooling the tube.

9. A method of packaging or unitising an article or a plurality of articles, comprising wrapping a film as defined in claim 1 around the article or plurality of articles.

10. An article wrapped with a film as defined in claim 1.

11. An article comprising a plurality of sub-articles held together and at least partially bounded by a composite multi-layer blown stretch film at least partially wrapped around said plurality of sub-articles;

wherein said composite film comprises at least about 90 wt % polyethylene and less than about 500 ppm of each one of: tackifiers, slip agents and anti-block agents, and comprises:

a first sub-film that comprises a cling side of said composite film and is directed toward, and in at least partial contact with, at least some of said sub-packages; and a second sub-film that comprises a non-cling side of said composite film and is directed away from said sub-packages;

wherein said first sub-film of said composite film has surface cling properties and comprises a copolymer comprising ethylene and a C$_{4-8}$ α-olefin, wherein said copolymer is substantially homogeneously branched and has a narrow short chain branching distribution of up to about six carbon atoms per branch, wherein said copolymer has a density of about 0.850 to 0.890 gm/cm$^3$ and wherein said second sub-film has no measurable high density fraction; and wherein said second sub-film of said composite film has surface non-cling properties and comprises at least about 70 wt. % of a low density ethylene polymer, and wherein said second sub-film has a density of about 0.915 to 0.940 gm/cm$^3$; has a coefficient of friction below about 1; has a cling, as measured by ASTM D1619-A3 on an unstretched film, of at most 12 g/cm; and has a level of cling of its surface to the surface of the non-cling sub-film, as measured by ASTM D4649-A3, of about 39 to 236 g/cm.

12. An article as claimed in claim 11 wherein said multi-layer film additionally comprises at least one core layer of plastic film adhered to said first and second layers.

13. An article as claimed in claim 11 wherein said first sub-film has a density of about 0.860 to 0.880 gm/cm$^3$ and said second sub-film has a density of about 0.920 to 0.940 gm/cm$^3$.

14. An article as claimed in claim 11 wherein said second sub-film consists essentially of a long chain branched low density polyethylene made by a high pressure process.

15. An article as claimed in claim 12 wherein said core layer is at least one member selected from the group consisting of low density polyethylene having a density of about 0.916 to 0.929 gm/cm$^3$, medium density polyethylene having a density of about 0.930 to 0.945 gm/cm$^3$, high density polyethylene having a density greater than about 0.945 gm/cm$^3$, linear low density polyethylene having a density of about 0.916 to 0.929 gm/cm$^3$, and very low density polyethylene having a density of less than about 0.915 gm/cm$^3$.

16. A method of reducing noise of unwinding a multi-layer blown stretch plastic film, wherein said film comprises a first sub-layer having cling properties and a second sub-layer having non-cling properties, from a roll of such film to no higher than about 85 dB;

wherein said film comprises:

a first sub-film that comprises a first side of said composite film and is adapted to be directed toward, and in at least partial contact with, at least some of a plurality of sub-packages; and a second sub-film that comprises a second side of said composite film and is adapted to be directed away from said plurality of sub-packages;

wherein said first sub-film of said composite film has surface cling properties and comprises a copolymer comprising ethylene and a $C_{4-8}$ α-olefin wherein said copolymer is substantially homogeneously branched and has a narrow short chain branching distribution of up to about six carbon atoms per branch, has no measurable high density fraction and wherein said copolymer has a density of about 0.850 to 0.890 gm/cm$^3$; and wherein said second sub-film of said composite film has surface non-cling properties and comprises at least about 70 wt. % of a low density ethylene polymer having a density of about 0.915 to 0.940 gm/cm$^3$;

wherein said unwinding noise reduction is measured by comparison to unwinding a multi-layer blown stretch plastic film, comprising a first layer having cling properties and a second layer having non-cling properties, of substantially the same sub-film and composite film thicknesses and width at substantially the same unwinding speed and under substantially the same conditions, except for the composition of at least one of said first and second sub-film.

* * * * *